3,267,111
LACTAM PROCESS
John J. Vill, Wheaton, Md., assignor to W. R. Grace & Co., a corporation of Connecticut
No Drawing. Filed Nov. 8, 1962, Ser. No. 236,429
6 Claims. (Cl. 260—297)

The present invention relates to the preparation of lactams, and more specifically to a novel one-step method for preparing lactams from ketones and acrylonitrile.

It is generally known that lactams may be prepared by cyclizing amino acids to obtain the corresponding cyclic amides (lactams). It is also known that lactams may be prepared by heating lactones with ammonia under pressure. Obviously such preparative methods are limited to the availability of the required amino acids or lactone.

The preparation and isolation of other than the most simple amino acids or lactones is a difficult and relatively costly procedure. Therefore, a general method for preparing a wide spectrum of lactams by methods which require only readily available raw materials would be a most useful technique to those engaged in the study and production of lactams.

It is therefore, an object of the present invention to provide an economical convenient method for preparing many different lactams.

It is another object to provide a general preparatory method by which a wide variety of lactams may be obtained from readily available ketones and acrylonitrile.

These and still further objects of the present invention will become readily apparent to one skilled in the art from the following detailed description and specific examples.

In general, the present invention contemplates a method for preparing lactams which comprises reacting a ketone with acrylonitrile in the presence of a catalytic mixture which comprises (1) a basic compound such as a primary amine or ammonia; (2) an organic acid; and (3) a minor amount of water.

More specifically, I have found that when approximately equal molar amounts of a ketone having at least one active hydrogen atom in the alpha position, and acrylonitrile are heated together at a temperature in excess of about 125° C. in the presence of minor catalytic amounts of primary amine and/or ammonia, an organic or inorganic acid, and small amounts of water the corresponding lactam will be obtained.

The present novel reaction may be illustrated by the following general equation:

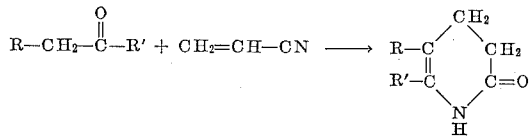

wherein R represents hydrogen, alkyl, aryl or alkaryl, and R' may be either alkyl aryl or alkaryl. It is further intended that R and R' may be combined to form a single divalent alkylene radical which forms a cyclic structure with a carbonyl carbon atom.

In general, ketones which may be utilized in accordance with the present invention, are those set forth in the above general equation wherein the alkyl substituents possess from about 1 to 20 carbon atoms. When R and R' represent alkaryl, the alkyl radical may have from 1 to about 4 carbon atoms and the aryl group may be phenyl, naphthyl, and other condensed benzene structures having up to about six units.

On occasion when R and R' form a cyclic forming alkylene radical R and R' may represent from about 2 to about 20 contiguous methylene groups.

While the above general equation only illustrates monomeric and monofunctional ketones, it is intended that the present invention may be practiced using polymeric and polyfunctional ketones such as are obtained by condensing ethylene and carbon monoxide.

Specific examples of ketones which may be used for the practice of the present invention are aliphatic ketones such as acetone, methylethyl ketone, methylpropyl ketone, diethyl ketone, acetyl acetone, or acetonyl acetone. Furthermore, cycloaliphatic ketones such as cyclopentanone, cyclohexanone, 2- or 4-methylcyclohexanone, 1- or 2-oxo-decahydronaphthalene, cyclohexanedione-(1,2) or cyclohexanedione-(1,4). Furthermore, mixed aliphatic-aromatic ketones such as acetophenone, propiophenone or 1- or 2-oxo-tetrahydronaphthalene may be used.

The present reaction requires the presence of a catalytic composition which comprises (1) a basic component selected from the group consisting of primary amines and/or ammonia, (2) an acid which may be either an organic or inorganic acid, and (3) a minor amount of water. While the precise ratio of each catalytic ingredient to the other is not critical to the effective practice of the invention, the catalytic mixture preferably contains 1 to 5 equivalent weights of amine for each equivalent weight of acid in the mixture. The water ingredient, which is effective in very low concentrations i.e. almost trace amounts, is present in the catalytic mixture in amounts ranging from about 0.1 to about 3% by weight of the total amine and/or ammonia and acid present.

In addition to ammonia, primary amines which are suitable for practicing the invention are aliphatic amines such as methylamine, ethylamine, normal propylamine, isopropylamine, normal butyl amine, isobutylamine, secondary butylamine, tertiary butylamine, normal amylamine, isoamylamine, normal dodecylamine, ethylenediamine, tetramethylenediamine and hexamethylenediamine. Furthermore, cycloaliphatic amines may be used such as cyclopentylamine, cyclohexylamine, hexahydrobenzylamine and 2- or 4-methylcyclohexylamine. It is also contemplated that aromatic amines may be used such as benzylamine, aniline, ortho-m- or p-toluidine, phenylenediamine and benzidine. Furthermore, amino acids such as glycocoll and ε-aminocaproic acid may be used in addition to amino-alcohols such as aminoethanol and aminopropanol.

The acid ingredient of the catalytic mixture may be a carboxylic acid such as formic acid, acetic acid, butyric acid, chloroacetic acid, benzoic acid, oxalic acid, succinic acid, adipic acid, or phthalic acid. Furthermore, inorganic acids such as hydrochloric acid, sulphuric acid, and phosphoric acid may be used.

Obviously, the amine, ammonia-acid ingredients may be used in the form of their salts. For example, ammonium acetate may be conveniently used in the practice of the invention in lieu of the separate free ammonia and acetic acid ingredients.

In conducting the present reactions, it is desired to maintain a mildly basic condition in the reaction mixture. In general this condition may be defined as a pH range of from about 5 to 12 when measured in aqueous solution. When the preferred amounts of catalytic mixture of from about 0.05 to about 5% by weight based on the amount of acrylonitrile present in the reaction mixture is used, the required basic condition is maintained.

In view of the fact equivalent amounts of ketone and acrylonitrile react to produce a mole of the desired lactam, it is generally found that equal molar amounts of reactants result the most efficient practice of the invention. However, increasing the ratio with the respect to the ketone content will not alter the course of the reaction and up to about 5 moles of ketone per mole of acrylonitrile may be used with good results. On the other hand, a molar excess of acrylonitrile should generally be avoided.

The presently proposed reaction will take place at a measurable rate at any temperature in excess of about 125° C. Furthermore, it is found that reaction temperatures as high as about 250° C. may be used with satisfactory results provided the pressure apparatus required to contain the volatile reactants is available. It is further contemplated that temperatures even in excess of 250° C. may be used, however, temperatures in excess of about 250° C. do not appreciably increase the rate of reaction and practical considerations negate any advantages obtained from exceeding this temperature. In general it may be said that the precise temperature selected to conduct a specific reaction will depend on the volatility of the specific reactants and the equipment which is available to conduct the reaction. Using the temperatures generally specified above, it is found that reaction periods in the general order of 15 to 30 minutes will yield a substantial amount of the desired lactam. Ordinarily, reaction periods lasting from about 0.5 to about 4 hours will insure that the reaction is brought substantially to completion. It is further contemplated the continuous operation of the present invention may be carried out with residence times in order of 15 to 30 minutes will constitute an efficient practice of the invention. Using the above generally defined limits of temperature and time, it is found that yields of up to about 90% lactam may be easily obtained by practicing the present invention.

Subsequent to the reaction period at elevated temperatures it is frequently found that the desired lactam product will solidify when cooling to room temperature. The solid product may then be taken up in solvent and subsequently recrystallized to obtain the required purity. The other instances, the desired product may be distilled directly from the reaction mixture.

Having generally described the basic aspects of the present invention, the following specific examples to illustrate preferred embodiments thereof.

*Example I*

A mixture comprising 490 grams of cyclohexanone, 265 of acrylonitrile, 25 grams of cyclohexylamine, 6 grams of glacial acetic acid, and about 0.1 grams of water were mixed and heated together at room temperature of 200° C. The mixture was maintained at this temperature with stirring for 4 hours. Upon cooling the reaction mixture to room temperature, a solid precipitated which was taken up in an ethanol-water mixture and subsequently recrystallized. Subsequent drying gave 533 grams (70% yield) of 1,2,3,4,5,6,7,8-octahydro-2-quinolone having the formula

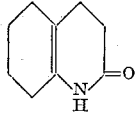

The melting point of this compound was found to be 143–145° C.

*Example II*

A mixture containing 100 grams 4-methylcyclohexanone, 47 grams of acrylonitrile, 5 grams of 4-methyl cyclohexylamine, and 1 ml. of 50% acetic acid in water was prepared. The reaction was heated to 200° C. for approximately 12 hours and then cooled to room temperature. Upon cooling a solid precipitate was obtained which was taken up in methanol, then recrystallized to yield 75 grams of 6-methyl-1,2,3,4,5,6,7,8-octahydro-2-quinolone which possessed a melting point of 138–139° C.

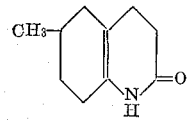

*Example III*

A reaction mixture containing 490 grams of cyclohexanone, 265 grams of acrylonitrile, 25 grams of normal butyl amine, 6 grams of acetic acid, and 0.1 gram of water were heated at a temperature of 200° C. for 4 hours. The mixture was cooled whereupon a solid precipitate was obtained which was subsequently taken up and recrystallized from a ethanol-water mixture. This procedure gave 40% yield of 1,2,3,4,5,6,7,8-octahydro-2-quinolone. A melting point of the product was 143–145° C.

*Example IV*

A pressure vessel was charged with 98 grams of cyclohexanone, 53 grams of acrylonitrile, 1 ml. of 28% aqueous ammonia and 3 grams of ammonium acetate. The vessel was then heated to 200° C. where upon the pressure of 150 p.s.i. was obtained. The pressure was subsequently reduced to 100 p.s.i. and maintained thereat for an additional 20 minutes. Subsequently, the material was removed from the pressure vessel and worked up to obtain a 90% yield of the 1,2,3,4,5,6,7,8-octahydro-2-quinolone described in Example I.

*Example V*

In a pressure vessel was placed 84 grams of cyclopentanone, 53 grams of acrylonitrile, 1 ml. of 28% aqueous ammonia, and 3 grams of ammonium acetate. The temperature of the reaction mixture was raised to 220° C. whereupon a pressure of 125 p.s.i. was achieved and maintained for 5 minutes. Subsequently, the pressure decreased to 110 p.s.i. and maintained thereat for 30 minutes. The mixture was then distilled at 105° C. at 9 mm. mercury pressure and the distillate was cooled to 20° C. whereupon a solid was formed which was identified as 1,3,4,5,6,7,H-2-keto-2-pyrindene which possessed a melting point of 103–105° C.

*Example VI*

A mixture comprising 116 grams of acetone, 53 grams of acrylonitrile, 1 ml. of 28% aqueous ammonium hydroxide, and 3 grams of ammonium acetate were placed in a pressure container and heated to 225° C. Pressure in the container remained at 350 p.s.i. for 10 minutes and after 40 minutes decreased 280 p.s.i. The reaction mixture was then distilled at 95 to 100° C. at 9 mm. mercury pressure and cooled to −20° C. The cooled distillate was then filtered to yield 12 grams of solid which represented a 11% yield of 6-methyl-1,2,3,4-tetrahydro-2-pyridone having a melting point of 119–120° C.

The above specific examples clearly indicate that lactams may be conveniently produced in good yield by reacting the appropriate ketone with acrylonitrile in the presence of the novel catalytic mixture contemplated herein.

I claim:

1. A method for preparing a lactam of the formula

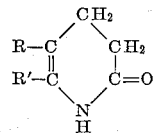

wherein R is selected from the group consisting of hydrogen, alkyl, phenyl and alkyl phenyl, and R' is selected from the group consisting of alkyl, phenyl and alkylphenyl, and R and R' are combined to form an alkylene radical, which comprises reacting a ketone of the formula

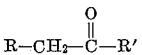

wherein R and R' have the meanings given previously with acrylonitrile at a temperature in excess of about 125° C. in the presence of a catalytic amount of a mixture comprising:

(1) a basic compound selected from the group consisting of ammonia and primary amines,
(2) an acid, and
(3) water said mixture containing from about 1 to about 5 equivalents of basic compound per equivalent of acid, and from about 0.1 to about 3% by weight of water based on the composite weight of said basic compound and acid; and recovering the lactam formed thereby.

2. The method of claim 1 wherein the reaction is conducted at a temperature of from about 125–250° C.

3. The method of claim 1 wherein said catalytic mixture is present in amounts of from about 0.05 to 5 parts by weight per weight of acrylonitrile.

4. The process of claim 1 wherein the ketone is an aliphatic ketone.

5. The process of claim 1 wherein the ketone is the cycloaliphatic ketone.

6. The process of claim 1 wherein the primary amine is an aliphatic amine.

References Cited by the Examiner

UNITED STATES PATENTS

| | | | |
|---|---|---|---|
| 2,850,519 | 9/1958 | Krimm | 260—464 |
| 3,150,142 | 9/1964 | Eby | 260—289 |

OTHER REFERENCES

Germany, Auslegeschrift 1,092,919, November 1960 (2 pp. spec.).

Allen et al., J. Am. Chem. Soc., vol. 59, pp. 686–9 (1937).

Cyanamid, "Chemistry of Acrylonitrile," 2nd Edition, 1954, pages 3, 17–20.

Hauser et al., J. Am. Chem. Soc., vol. 79, pp. 728–31 (1937).

Kohler et al., J. Am. Chem. Soc., vol. 44, pp. 2536–56; pp. 2536–40 relied on (1922).

ALEX MAZEL, *Primary Examiner.*

DUVAL T. McCUTCHEN, *Examiner.*

DONALD G. DAUS, DON M. KERR,
*Assistant Examiners.*